106. COMPOSITIONS, COATING OR PLASTIC.

Patented Mar. 12, 1935

1,994,438

UNITED STATES PATENT OFFICE 1,994,438

PAINT COMPOSITION

Herman A. Scholz, Oak Park, and Osborne Haydon, Chicago, Ill., assignors to United States Gypsum Company, Chicago, Ill., a corporation of Illinois No Drawing. Application October 22, 1931, Serial No. 570,502

11 Claims. (Cl. 134—46)

This invention relates to a paint composition, and has reference more particularly to a paint composition in powdered form adapted to be mixed with water before application.

In the copending application of Herman A. Scholz, Serial 428,490 filed February 14, 1930, a paint composition was described which was suitable for use for exterior purposes. This composition contained among other ingredients, hydrated lime in excess with a minor proportion of Portland cement. While this composition proved effective for the purpose intended, the present application deals with a composition in which the Portland cement is in excess and the lime is in minor proportion. The present invention also omits some of the fillers disclosed in said application. The composition to be hereinafter described is superior to the composition described in said application in that it sets more rapidly, becomes harder, and has a less tendency to dust after application.

An object of the invention therefore is to provide a composition for a water paint in which the paint sets more rapidly, becomes harder and has a less tendency to dust after application than paints commonly used for this purpose; also to improve paint compositions in other respects hereinafter specified and claimed.

Our preferred formula for the paint composition is as follows:

| | Per cent |
|---|---|
| White Portland cement (waterproof) | 62.5 |
| High calcium hydrated lime | 31.1 |
| Irish moss (powdered) | .1 |
| Salt (NaCl) | 6.0 |
| Calcium acetate ($Ca(C_2H_3O_2)_2$) | .3 |
| | 100.0 |

The hydrated lime should be white in color and is preferably of high calcium lime, but a dolomitic lime may be used. It acts both as a pigment and as a binding agent. It may vary in proportion from 20% to 45%.

Waterproof white Portland cement is preferred, but ordinary white Portland cement may be used and the waterproofing, such as calcium stearate, added separately to the extent of 2% based upon the cement. Ordinary gray Portland cement or other hydraulic cement may be used in the darker shades where the color does not become objectionable. This ingredient is a binding and hardening agent and also acts as a pigment. This may be varied between 50% and 75% of the composition.

The salt (sodium chloride) or other soluble chlorides, should be a good grade and as free as possible from deliquescent impurities. Since it is a highly ionized electrolyte, it prevents the formation of excessive colloidal gels by the lime and Portland cement. It also hastens the set of the paint and improves the hardness and the bond. This may vary between 2% and 8% and may be replaced by potassium chloride or other soluble chlorides.

The Irish moss (chondrus) prevents settling of the mixed paint. It may be replaced by pectin, agar-agar or similar agents producing gels. The amount may be decreased to .05%, increased to 0.5%, or the ingredient may be entirely eliminated.

Calcium acetate retards the formation of excessive colloidal gels by the lime and Portland cement in the wet mix, and thus lengthens the application period of the paint. It may be replaced by other inorganic acetates such as zinc acetate or sodium acetate. It may be varied in proportion from 0.1% to 1.0%.

The ingredients of our composition may be mixed in any desired order. The dry mixture is mixed with water to desired painting consistency and may be sprayed or brushed onto a surface to be coated. Usually about 75-90 pounds of water are necessary for 100 pounds of the dry mixture.

As indicated in the above preferred formula, we prefer a ratio of Portland cement to lime of 2:1 when we use a high calcium, hydrated lime. However, we do not wish to be confined strictly to that ratio, as we desire in some cases to raise the proportion of lime somewhat, such as when we use a dolomitic lime instead of a high calcium lime. Similarly, we may, when using a gray Portland cement, which is alkaline, instead of white Portland cement, which is neutral, raise the ratio of Portland cement content in order to get the desired results. Thus the 2:1 ratio may vary somewhat due to possible changes in raw materials in order to balance the formula.

This paint is suitable only for application to clean, porous surfaces such as stucco, cement, brick, tile, etc. Like cement or lime, it has a rather low elasticity, but becomes an integral part of a material with a porous surface when the coefficient of expansion is nearly the same. It will not adhere to wood or metal or to greasy surfaces, or surfaces which have been painted with oil or casein paint, or paints with other organic binders.

While the above description constitutes a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:—

1. A coating composition comprising a dry mixture of hydraulic cement in major proportion, hydrated lime in minor proportion, soluble chloride, and an acetate from the group consisting of calcium, zinc, and sodium acetates.

2. A coating composition comprising a dry mixture of a major proportion of hydraulic cement, hydrated lime, a gel forming substance from the group Irish moss, pectin and agar-agar, a soluble chloride, and an acetate from the group consisting of calcium, zinc, and sodium acetate.

3. A coating composition comprising a dry mixture of hydraulic cement in major proportion, hydrated lime in minor proportion, a soluble chloride, an acetate from the group consisting of calcium, zinc, and sodium acetates and 75–90 lbs. of water per 100 lbs. of the dry mixture.

4. A coating composition comprising a dry mixture of Portland cement in major proportion, hydrated lime, Irish moss, salt and calcium acetate.

5. A coating composition comprising a mixture of hydraulic cement in major proportion, hydrated lime, Irish moss, salt and calcium acetate.

6. A coating composition comprising a mixture of Portland cement in major proportion, hydrated lime, salt and 0.1–1% zinc acetate.

7. A coating composition comprising a mixture of hydraulic cement in major proportion, hydrated lime, 2–8% salt and 0.1–1% sodium acetate.

8. A coating composition comprising hydraulic cement and hydrated lime in proportions of 2:1 respectively, a soluble chloride and an acetate from the group consisting of calcium, zinc, and sodium acetates.

9. A coating composition having approximately the following composition:

| | Percent |
|---|---|
| White Portland cement (waterproof) | 62.5 |
| High calcium hydrated lime | 31.1 |
| Irish moss (powdered) | .1 |
| Salt (NaCl) | 6.0 |
| Calcium acetate ($Ca(C_2H_3O_2)_2$) | .3 |
| | 100.0 |

10. A paint composition comprising the following ingredients in the proportions named:—

| | Percent |
|---|---|
| Portland cement | 50–70 |
| Hydrated lime | 20–35 |
| Soluble chloride | 2–8 |
| Inorganic acetate | 0.1–1.0 |

Water—75–90 lbs. per 100 lbs. of the above dry mixture.

11. A dry paint composition suitable for mixing with water, comprising the following ingredients in the proportions named:—

| | Percent |
|---|---|
| Portland cement | 50–70 |
| Hydrated lime | 20–35 |
| Soluble chloride | 2–8 |
| Inorganic acetate | 0.1–1.0 |

HERMAN A. SCHOLZ.
OSBORNE HAYDON.